(12) United States Patent
Kim et al.

(10) Patent No.: US 11,274,044 B2
(45) Date of Patent: Mar. 15, 2022

(54) METHOD FOR PRODUCING AEROGEL BLANKET AND AEROGEL BLANKET PRODUCED THEREBY

(71) Applicant: LG CHEM, LTD., Seoul (KR)

(72) Inventors: Mi Ri Kim, Daejeon (KR); Kyoung Shil Oh, Daejeon (KR); Je Kyun Lee, Daejeon (KR); Young Hun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 679 days.

(21) Appl. No.: 15/569,056

(22) PCT Filed: Mar. 8, 2017

(86) PCT No.: PCT/KR2017/002530
§ 371 (c)(1),
(2) Date: Oct. 24, 2017

(87) PCT Pub. No.: WO2017/155311
PCT Pub. Date: Sep. 14, 2017

(65) Prior Publication Data
US 2018/0134566 A1    May 17, 2018

(30) Foreign Application Priority Data

Mar. 8, 2016  (KR) .................. 10-2016-0027784
Sep. 26, 2016 (KR) .................. 10-2016-0123394
(Continued)

(51) Int. Cl.
*B32B 9/00*       (2006.01)
*C01B 33/158*    (2006.01)
(Continued)

(52) U.S. Cl.
CPC ....... *C01B 33/1585* (2013.01); *B01J 13/0091* (2013.01); *B01J 31/02* (2013.01);
(Continued)

(58) Field of Classification Search
CPC ........ B82Y 10/00; B82Y 30/00; Y10T 428/30
(Continued)

(56) References Cited

U.S. PATENT DOCUMENTS 5,587,107 A   12/1996  Schwertfeger et al.
5,789,075 A    8/1998  Frank et al.
(Continued)

FOREIGN PATENT DOCUMENTS

CN   104891509 A    9/2015
JP   10-504792 A    5/1998
(Continued)

OTHER PUBLICATIONS

Database WPI: "Preparation of hydrophobic silica aerogel and aerogel composite material by preprocessing sol, adding alkali catalyst, adjusting pH, adding inorganic fiber composite material, aging, drying, spraying with silane compound, and heating", XP002779582, Thomson Scientific, Jun. 2016 (Corresponds to CN104891509A).

*Primary Examiner* — Daniel H Miller
(74) *Attorney, Agent, or Firm* — Morgan, Lewis & Bockius LLP

(57) ABSTRACT

The present invention relates to a method for producing an aerogel blanket exhibiting excellent hydrophobicity at high temperatures and an aerogel blanket produced thereby. The present invention uses a mixture of silica sol and a hydrophobic aerogel powder as an aerogel precursor and thus can achieve hydrophobicity in the internal structure as well as on the surface of the aerogel included in the aerogel blanket. Accordingly, the aerogel blanket can attain high hydropho-
(Continued)

bicity and thus can exhibit excellent hydrophobicity retention ability even in high-temperature applications.

19 Claims, 6 Drawing Sheets

(30) Foreign Application Priority Data

| Mar. 8, 2017 | (KR) | 10-2017-0029619 |
|---|---|---|
| Mar. 8, 2017 | (KR) | 10-2017-0029620 |
| Mar. 8, 2017 | (KR) | 10-2017-0029621 |

(51) Int. Cl.

| B01J 31/02 | (2006.01) |
|---|---|
| F16L 59/06 | (2006.01) |
| B01J 13/00 | (2006.01) |
| C01B 33/154 | (2006.01) |
| C01B 33/146 | (2006.01) |
| F26B 21/14 | (2006.01) |
| F26B 5/00 | (2006.01) |
| F16L 59/02 | (2006.01) |
| B82Y 10/00 | (2011.01) |

(52) U.S. Cl.
CPC .......... *C01B 33/146* (2013.01); *C01B 33/154* (2013.01); *C01B 33/158* (2013.01); *F16L 59/026* (2013.01); *F16L 59/06* (2013.01); *F26B 5/00* (2013.01); *F26B 21/14* (2013.01); *B82Y 10/00* (2013.01); *Y10T 428/30* (2015.01)

(58) Field of Classification Search
USPC .......................................................... 428/408
See application file for complete search history.

(56) References Cited

U.S. PATENT DOCUMENTS

| 6,068,882 | A | * | 5/2000 | Ryu | C04B 14/302 |
|---|---|---|---|---|---|
| | | | | | 427/246 |
| 7,078,359 | B2 | | 7/2006 | Stepanian et al. | |
| 7,504,346 | B2 | | 3/2009 | Stepanian et al. | |
| 2001/0034375 | A1 | | 10/2001 | Schwertfeger et al. | |
| 2002/0094426 | A1 | | 7/2002 | Stepanian et al. | |
| 2006/0199455 | A1 | | 9/2006 | Stepanian et al. | |
| 2006/0246806 | A1 | | 11/2006 | Rhine et al. | |
| 2009/0229032 | A1 | | 9/2009 | Stepanian et al. | |
| 2009/0247655 | A1 | | 10/2009 | Kim et al. | |
| 2010/0288160 | A1 | * | 11/2010 | Maisels | C01B 32/05 |
| | | | | | 106/31.13 |
| 2012/0025127 | A1 | * | 2/2012 | Yeo | C01B 33/155 |
| | | | | | 252/62 |
| 2013/0344279 | A1 | | 12/2013 | Doshi et al. | |
| 2014/0044929 | A1 | | 2/2014 | Evans et al. | |
| 2015/0060026 | A1 | * | 3/2015 | Kim | B32B 15/20 |
| | | | | | 165/133 |
| 2017/0081495 | A1 | | 3/2017 | Evans et al. | |
| 2017/0101773 | A1 | | 4/2017 | Doshi et al. | |
| 2018/0016152 | A1 | | 1/2018 | Huber et al. | |

FOREIGN PATENT DOCUMENTS

| JP | 11-513349 A | 11/1999 |
|---|---|---|
| JP | 2004-517222 A | 6/2004 |
| JP | 2014-035044 A | 2/2014 |
| JP | 2015-524491 A | 8/2015 |
| JP | 2015-528071 A | 9/2015 |
| KR | 10-2000-0057244 A | 9/2000 |
| KR | 10-0710887 B1 | 4/2007 |
| KR | 10-2009-0069187 A | 6/2009 |
| KR | 10-2010-0053350 A | 5/2010 |
| KR | 10-2010-0120036 A | 11/2010 |
| KR | 10-2012-0070948 A | 7/2012 |
| WO | 2014/126490 A1 | 8/2014 |
| WO | 2016/123724 A1 | 8/2016 |

* cited by examiner

METHOD FOR PRODUCING AEROGEL BLANKET AND AEROGEL BLANKET PRODUCED THEREBY

CROSS-REFERENCE TO RELATED APPLICATION

This application is a National Stage Application of International Application No. PCT/KR2017/002530 filed on Mar. 8, 2017, which claims the benefit of Korean Patent Application No. 10-2016-0027784 filed on Mar. 8, 2016, Korean Patent Application No. 10-2016-0123394 filed on Sep. 26, 2016, Korean Patent Application No. 10-2017-0029619 filed on Mar. 8, 2017, Korean Patent Application No. 10-2017-0029620 filed on Mar. 8, 2017 and Korean Patent Application No. 10-2017-0029621 filed on Mar. 8, 2017, all of which are hereby incorporated by reference in their entirety for all purposes as if fully set forth herein.

TECHNICAL FIELD

The present invention relates to a method for producing an aerogel blanket exhibiting excellent hydrophobicity at high temperatures and an aerogel blanket produced thereby.

BACKGROUND ART

Aerogel is a superporous material with a high specific surface area ($\geq 500$ m$^2$/g), having a porosity of about 90 to 99.9% and a pore size in a range of 1 to 100 nm. Since aerogel is a material having excellent ultra-lightweight/superthermal insulation/ultra-low dielectric properties, etc., research on developing an aerogel material and using the same as a material for a transparent thermal insulation material, an environmentally friendly thermal insulation material for high temperatures, an extremely-low dielectric film for a highly integrated device, a catalyst, a catalyst carrier, an electrode for a supercapacitor, or an electrode for seawater desalination is actively ongoing.

The greatest advantage of aerogel is a superthermal insulation property characterized by a thermal conductivity of 0.300 W/mK or less, which is lower than that of a conventional organic thermal insulation material such as Styrofoam. Also, the use of aerogel may remedy critical weaknesses of an organic thermal insulation material, such as fire vulnerability and generation of harmful gas when caught on fire.

However, despite having such excellent material properties, aerogel has extremely limited applications because the production process thereof is complex and the unit production cost thereof is high. Also, a high porosity of aerogel results in very low mechanical strength, thus making the aerogel easily breakable even upon a small impact. Therefore, composite fabrication techniques for aerogel blankets that supplement weaknesses of aerogel itself and enable aerogel to be processed into various forms have been recently researched.

An aerogel blanket refers to an aerogel composite material produced into a mattress or sheet form and is flexible such that it can be bent, folded, or cut. Hence, its potential applications are thermal insulation for pipes, clothing, etc., and various industrial applications are also possible. Being a composite consisting of fibers and aerogel, the aerogel blanket can attain flexibility. The fibers serve to enhance the flexibility and mechanical strength of the aerogel blanket, and the aerogel provides thermal insulation properties attributable to a porosity thereof. The core composite fabrication techniques for an aerogel blanket increases benefits and supplement weaknesses of fibers and aerogel by combining characteristics of both.

As a novel material exhibiting excellent thermal resistance and thermal insulation properties compared to conventional polymeric thermal insulation materials such as polystyrene foam or polyurethane foam, the aerogel blanket is attracting attention as an advanced material capable of providing a solution to energy conservation and environmental problems in the future.

Conventional aerogel blankets are produced by mixing fibers with silica sol obtained from water glass or an alkoxide-based precursor and gelating the mixture, which is then aged, surface modified, and dried. However, the aerogel blankets produced according to the conventional method normally undergo hydrophobization only on surfaces thereof and thus tend to easily lose hydrophobicity upon baking at a high temperature of 400° C. or more. As the temperature increases during baking, hydrophobic groups inside aerogel pores, such as a methyl group or an ethyl group, are subjected to combustion, which results in loss of hydrophobicity. When the hydrophobicity is lost, thermal insulation performance degrades due to moisture permeation. Also, the pore structure is destroyed due to contraction occurring in the process of evaporation of permeated water, thus leading to a permanent loss of thermal insulation performance.

For example, U.S. Pat. No. 5,789,075 discloses a method for producing an aerogel blanket using water glass or an alkoxide-based precursor as the sole precursor of silica sol. However, when only water glass is used, the spring-back effect does not occur during a drying process. This results in a reduced thickness and a failure to attain a porosity of 90% or more, which, in turn, leads to high thermal conductivity. Meanwhile, with the use of an alkoxide-based precursor alone, properties such as thermal conductivity are well exhibited initially, but hydrophobicity is easily lost upon treatment at high temperature, in which case the aerogel blanket loses its function as a thermal insulation material. In addition, an alkoxide-based precursor is expensive, and thus the use thereof is uneconomical.

Therefore, to use an aerogel blanket as a thermal insulation material, etc., it is important that hydrophobic groups stably exist inside pores to maintain hydrophobicity at high temperatures and prevent durability at high temperatures from deteriorating. Hence, a technique capable of producing an aerogel blanket applicable at high temperatures is needed.

(Patent Document 1) U.S. Pat. No. 5,789,075 B

DETAILED DESCRIPTION OF THE INVENTION

Technical Problem

The present invention is designed to solve the aforementioned problems of conventional art and is directed to providing a method for producing a high-temperature superhydrophobic aerogel blanket capable of retaining excellent hydrophobicity even at high temperatures.

The present invention is also directed to provide a high-temperature superhydrophobic aerogel blanket produced according to the above method.

Technical Solution

In order to solve the aforementioned problems, the present invention provides a method for producing an aerogel blanket, the method including 1) a process of producing an aerogel precursor by mixing an aerogel powder with silica sol; 2) a process of producing a wet gel-substrate composite by adding a basic catalyst to the aerogel precursor, depositing the mixture onto a blanket substrate, and gelating the mixture; 3) a process of producing a hydrophobic wet gel-substrate composite by performing surface modification of the wet gel-substrate composite; and 4) a process of drying the hydrophobic wet gel-substrate composite.

Also, the present invention provides an aerogel blanket that includes aerogel and a blanket substrate, wherein the aerogel has a carbon content retention ratio (calculated according to Equation 2 provided below) that satisfies at least any one of 1) to 5) described below when heat-treated for one to five hours at a temperature greater or equal to 400° C. and less than 500° C.

Carbon content retention ratio (%)=(carbon content (wt %) in aerogel after heat treatment)/(initial carbon content in aerogel (wt %)) [Equation 2]

1) 75% or more upon one-hour heat treatment
2) 65% or more upon two-hour heat treatment
3) 60% or more upon three-hour heat treatment
4) 59% or more upon four-hour heat treatment
5) 58% or more upon five-hour heat treatment Also, the present invention provides an aerogel blanket including aerogel and a blanket substrate therein, wherein the aerogel has a carbon content retention ratio calculated according to Equation 2 provided below of 13% or more when heat-treated for one to five hours at a temperature of 500 to 600° C.

Carbon content retention ratio (%)=(carbon content (wt %) in aerogel after heat treatment)/(initial carbon content in aerogel (wt %)) [Equation 2]

Further, the present invention provides a thermal insulation material including the aerogel blanket.

Advantageous Effects of the Invention

The production method of the present invention can produce a high-temperature superhydrophobic aerogel blanket capable of retaining excellent hydrophobicity even at high temperatures.

The aerogel blanket produced according to the production method can be a useful thermal insulation material. The aerogel blanket can exhibit high hydrophobicity by containing aerogel hydrophobized in the internal structure as well as on the surface, and, by having excellent hydrophobicity retention ability, can have a low thermal conductivity growth rate even in a high-temperature application.

DESCRIPTION OF THE DRAWINGS

The following accompanying drawings in the specification illustrate preferred embodiments of the present invention and, together with the description of the invention provided above, serve to further the understanding of the technical spirit of the present invention. Therefore, the present invention should not be construed as being limited to the description of such drawings.

MODE OF THE INVENTION

Hereinafter, the present invention will be described in greater detail to aid understanding of the present invention.

The terms or words used in the present specification and claims should not be restrictively construed according to their ordinary or dictionary meaning, and, based on the principle that the inventor can appropriately define concepts of terms for describing his/her invention in the best way, should be interpreted to have the meaning and concept that are consistent with the technical spirit of the present invention.

In general, an aerogel blanket is produced either by using water glass or alkoxysilane alone or in combination to produce silica sol (hereinafter referred to as Method 1) or mixing a binder with a hydrophobized aerogel powder to produce sol (hereinafter referred to as Method 2), followed by adding a blanket substrate such as fiber, gelating the mixture, aging, surface modifying, and drying the same. However, when producing an aerogel blanket according to Method 1, surface modification is mostly accomplished only on the surface, making it difficult to attain hydrophobicity on the inside, and thus hydrophobicity may be easily lost at high temperatures. Meanwhile, when Method 2 is employed, the produced aerogel blanket may be able to retain hydrophobicity even at high temperatures thanks to the aerogel powder that is hydrophobized all the way to the inside, but the use of a binder leads to thermal conductivity growth and a large degree of aerogel dust generation due to weak binding.

Therefore, development of a high-temperature superhydrophobic aerogel blanket that can retain a high thermal insulation property by having both an excellent thermal conductivity property and excellent hydrophobicity retention ability at high temperatures is required.

Hence, the present invention provides a method capable of producing an aerogel blanket having both an excellent thermal conductivity property and excellent hydrophobicity retention ability at high temperatures by using a mixture of silica sol and an aerogel powder, wherein the aerogel powder is particularly an organic functional aerogel powder containing one or more organic functional groups on the surface thereof or a hydrophobic silica aerogel powder.

Hereinafter, a method for producing an aerogel blanket according to one embodiment of the present invention will be described in detail with reference to FIG. 1.

Figure 1:
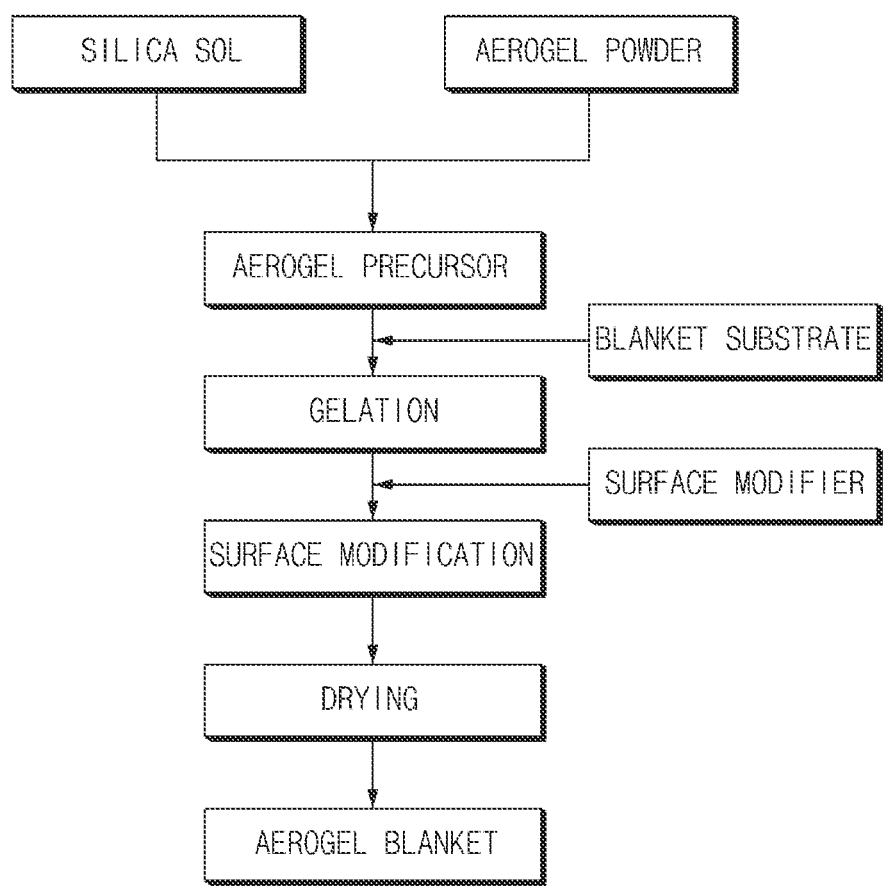
FIG. 1 is a flow chart for schematically illustrating a method for producing an aerogel blanket according to one embodiment of the present invention.

FIG. 1, which schematically illustrates the above production method according to one embodiment of the present invention, is merely an example for describing the present invention and does not limit the present invention thereto.

The method for producing an aerogel blanket according to one embodiment of the present invention includes:

1) a process of producing an aerogel precursor by mixing an aerogel powder with silica sol;

2) a process of producing a wet gel-substrate composite by adding a basic catalyst to the aerogel precursor, depositing the mixture onto a blanket substrate, and gelating the mixture;

3) a process of producing a hydrophobic wet gel-substrate composite by performing surface modification of the wet gel-substrate composite; and 4) a process of drying the hydrophobic wet gel-substrate composite.

The process 1) is a process for producing an aerogel precursor, and the aerogel precursor may be produced by mixing an aerogel powder with silica sol.

More specifically, the aerogel precursor may be produced by mixing an acidic aqueous solution with a mixed solution containing alkoxysilane and alcohol, allowing the mixture to react to produce silica sol, adding the aerogel powder to the silica sol, and performing mixing.

The silica sol used for producing the aerogel precursor serves as a chemical binder among aerogel powder particles in the production of an aerogel blanket, thereby enhancing binding among the aerogel powder particles and enabling homogeneous gelation. As a result, hydrophobicity and durability at high temperatures improve, thus enabling high thermal insulation performance. Specifically, the silica sol may be produced by mixing an acidic aqueous solution with a mixed solution containing alkoxysilane and alcohol and allowing the mixture to react.

Specifically, the alkoxysilane that can be used for producing the silica sol may be tetraethyl orthosilicate (TEOS), tetramethyl orthosilicate (TMOS), trialkoxysilane, etc., or a mixture including one or more thereof. More specifically, the alkoxysilane according to the present invention may be TEOS.

In addition, the alcohol that can be used for producing the silica sol may be, for example, an alcohol having one to six carbon atoms such as ethanol, but the present invention is not particularly limited thereto. The alcohol may be included in an amount that makes silica content in the mixed solution 2 to 6 wt %, and more specifically 3 to 5 wt %.

Also, the acidic aqueous solution used for producing the silica sol includes an acidic catalyst and water therein.

The water functions to hydrate alkoxysilane and also serves as a solvent to dissolve the acidic catalyst. Accordingly, the water may be added alone, separately from the acidic catalyst, or be added as an acidic aqueous solution in which the acidic catalyst is dissolved.

The acidic catalyst is a catalyst for promoting hydration reaction of alkoxysilane and may be included in an amount that makes the pH of the mixed solution 0.5 to 1. Specifically, the acidic catalyst may be hydrochloric acid, sulfuric acid, nitric acid, acetic acid, etc., or a mixture including one or more thereof.

Meanwhile, the aerogel powder mixed with the aforementioned silica sol to produce the aerogel precursor may specifically be a silica aerogel powder. More specifically, the surface of the aerogel powder may have been subjected to organic functionalization—specifically, silylation or hydrophobization—through surface modification, etc. based on the use of a compound having an organic functional group, particularly a hydrophobic functional group. The aerogel powder hydrophobized as thus is mixed with the silica sol and thereby forms a precursor for producing an aerogel blanket, and serves to enhance the hydrophobicity of the aerogel blanket, especially for the interior of the aerogel blanket.

Specifically, according to one embodiment of the present invention, the aerogel powder mixed with the aforementioned silica sol to produce the aerogel precursor may be an organic functional aerogel powder that has at least one, more specifically one, two, or three, organic functional groups on the interior surface of the aerogel. In this case, the organic functional groups may be identical or different.

Meanwhile, the organic functional group refers to a structure that has a polar atomic bond formed by the presence of a heteroatom in an organic group, and may react with a hydroxyl group or ether group on the surface of the aerogel. Specifically, the functional group may be a halogen group, a pseudohalogen group, a hydroxyl group, a thiol group, an amino group, an amide group, an ether group, an ester group, an acid group, a formyl group, a ketone group, a silyl group, or the like.

Also, the hydrocarbon group having the aforementioned functional group may be a branched or unbranched alkyl group having 1 to 22 carbon atoms, more specifically 1 to 12 carbon atoms. In this case, one or more methylene groups (—CH$_2$—) in the alkyl group may be substituted by an arylene group having four to ten carbon atoms, wherein the arylene group may contain —O—, —S—, —CO—, —COO—, —O—CO—O—, —CONR'—, —SO—, —SO$_2$—, —NH—CO—NH—, a cycloalkylene group having three to six carbon atoms, —CH=CH—, or a heteroatom (e.g. N, S, or O). Alternatively, one or more hydrogen atoms in the alkyl group may be substituted by at least one type of functional groups among F, Cl, Br, I, CN, SCN, —NCO, —OCN, —NO$_2$, —SO$_3$R", —PR'"$_2$, and —CHO (in which case, the R, R" and R'" may each independently be a hydrogen atom, an alkyl group having 1 to 12 carbon atoms, an aryl group having 6 to 12 carbon atoms, or an arylalkyl group having 7 to 12 carbon atoms such as a benzyl group).

Specifically, the organic functional aerogel powder may be any one aerogel powder selected from the group consisting of the following a) to d):

a) aerogel that contains a functional group represented by the following chemical formula (I)

  (I)

(where in the chemical formula, X may be a linear or branched alkylene group having 1 to 22 carbon atoms, and Y may be a halogen group, a pseudohalogen group, —SR$^1$, —PR$^2$R$^3$, an oxirane group, or CH$_2$=C(CH$_3$)—COO—. In this case, R$^1$ may be a hydrogen atom, a linear or branched alkyl group having 1 to 22 carbon atoms, or an aryl group having four to ten carbon atoms, and R$^2$ and R$^3$ may each independently be a linear or branched alkyl group having 1 to 22 carbon atoms or an aryl group having four to ten carbon atoms);

b) aerogel modified with an amino alcohol represented by the following chemical formula (II), which can be linked to the aerogel by an ether bridge

R$^4$—NH—R$^5$—OH    (II)

(where in the chemical formula, R$^4$ is selected from the group consisting of a hydrogen atom; an alkyl group having one to four carbon atoms; and a hydroxyalkyl group such as —(CH$_2$)$_3$—OH, and R$^5$ is an alkylene group having one to four carbon atoms);

c) aerogel modified with an aminoalkyl group such as —(CH$_2$)$_3$—NH$_2$ or —(CH$_2$)$_3$—NH—(CH$_2$)$_3$—NH$_2$ d) aerogel modified with a functional group represented by the following chemical formula (III)

R$^6$R$^7$N—(CHR$^8$)$_a$—N(R$^9$)—(CHR$^{10}$)$_b$—Si(OR$^{11}$)$_3$    (III)

(where in the chemical formula, R$^6$ is an alkyl group having one to eight carbon atoms, R$^7$, R$^8$ and R$^{11}$ are each independently selected from the group consisting of a hydrogen atom, an alkyl group having one to four carbon atoms, and an aryl group having six to ten carbon atoms, such as a phenyl group, R$^9$ and R$^{10}$ are each independently a hydrogen atom or an alkyl group having one to four carbon atoms, a is an integer from one to four, b is an integer from one to eight, and the functional groups are forming a complex with a metal element selected from the group consisting of Pd, Pt, Ni, Co, and Cu).

The organic functional aerogel powder may be produced by a process of reacting silica wet gel, which was obtained by gelating water glass through polycondensation, with an organic compound that is at least bifunctional, and then drying the product. Also, the organic compound that is at least bifunctional is characterized in that it has at least one functional group functioning as a linker that binds to aerogel. More specifically, the organic compound that is at least bifunctional may be one or more compounds selected from the group consisting of methyltrichlorosilane, dimethyldichlorosilane, trimethylchlorosilane, chloropropyltrichlorosilane, trimethylmethoxysilane, and hexamethyldisilazane.

Accordingly, the method for producing an aerogel blanket according to one embodiment of the present invention may further include a process of producing the organic functional aerogel powder prior to producing an aerogel precursor.

Specifically, the gelation may be implemented by adding an acidic ion-exchange resin or a mineral acid to an aqueous solution of water glass to produce silicic acid and then subjecting the silicic acid to a polycondensation reaction in a strong acid or base.

In addition, at least one of an aging process at a temperature of 0 to 100° C. and a pH of 4 to 11; and a solvent replacement process using an inert low-boiling-point organic solvent (e.g., at least one of aliphatic alcohols such as methanol, ethanol, n-propanol, or isopropanol; esters such as ethyl acetate; ethers such as dioxane; ketones such as acetone or tetrahydrofuran; aliphatic or aromatic hydrocarbons such as n-hexane or toluene) for the resulting gel may be optionally conducted as an additional process after the gelation.

Also, the organic compound that is at least bifunctional and can be used for surface functionalization (modification) of the gel may be a compound including at least one of the aforementioned organic functional groups. Specifically, the organic compound may be an aminoalcohol having a chemical formula of R$^4$—NH—R$^5$—OH (where in the chemical formula, R$^4$ and R$^5$ are as defined above), R$^{12}$$_{4-n}$SiCl$_n$, or R$^{13}$$_{4-n}$Si(OR$^{14}$)$_n$ (where n is an integer from 1 to 3; R$^{12}$ and R$^{13}$ may each independently be selected from the group consisting of a hydrogen atom, a linear or branched alkyl group having 1 to 18 carbon atoms, a cycloalkyl group having 3 to 18 carbon atoms, and an aryl group having 6 to 18 carbon atoms; and R$^{14}$ may be a linear or branched alkyl group having 1 to 18 carbon atoms). More specifically, the organic compound may be methyltrichlorosilane, dimethyldichlorosilane, trimethylchlorosilane, chloropropyltrichlorosilane, trimethylmethoxysilane, hexamethyldisilazane, or the like, and any one thereof or a mixture of two or more thereof may be used.

Meanwhile, the process of drying a gel that has been organically functionalized on the surface may be carried out at a temperature of −30 to 200° C., more specifically at a temperature of 0 to 200° C.; and under a pressure of 0.001 to 20 bars, more specifically under a pressure of 0.1 to 2 bars. The process may be continued until the residual solvent content in the gel reaches below 0.1 wt %.

Also, according to another embodiment of the present invention, the aerogel powder mixed with the aforementioned silica sol to produce the aerogel precursor may be an organic functional aerogel powder produced through the surface silylation of a hydrogel.

Specifically, the silylated organic functional aerogel powder may have been produced by modifying the surface of a hydrogel and then drying the resulting substance, in which case, the surface modification may specifically be surface silylation and the hydrogel may specifically be a silica-based hydrogel. The silica-based hydrogel may have been produced by a process of producing a SiO$_2$ gel by adjusting a pH of a water glass aqueous solution to 3 or less through the addition of an acidic ion-exchange resin, a mineral acid, or a hydrochloric acid solution thereto, followed by adding a base to perform polycondensation, washing the resulting gel with water, and drying the same. Alternatively, the silica-based hydrogel may have been produced as a result of going through an intermediate process of producing silica sol by adding an organic acid or mineral acid to a water glass solution and a drying process. More specifically, the silica-based hydrogel may have been produced through the hydrolysis and polycondensation of silicon tetrachloride. Also, the aforementioned surface modification, specifically surface silylation, may be carried out using a silylating agent in a liquid, gaseous, or vapor state to modify the surface of the hydrogel. In this case, an optional acid or base may be additionally added before or after introducing the silylating agent. Also, the surface modification, specifically surface silylation, may be carried out by using at least one silylating agent among disiloxane represented by the following chemical formula (IV); disilazane represented by the following chemical formula (V); and silane represented by the following chemical formula (VI) or chemical formula (VII) as the silylating agent, and reacting the silylating agent with the gel.

(R$_{a1}$)$_3$Si—O—Si(R$_{a2}$)$_3$    (IV)

(R$_{b1}$)$_3$Si—N(H)—Si(R$_{b2}$)$_3$    (V)

(R$_c$)$_{4-m}$SiCl$_m$    (VI)

(R$_d$)$_{4-n}$Si(OR$_e$)$_n$    (VII)

In the above formulae, $R_{a1}$, $R_{a2}$, $R_{b1}$, $R_{b2}$, $R_c$, $R_d$, and $R_e$ are each independently a hydrogen atom, or a radical that is non-reactive, organic, linear, branched, cyclic, saturated, unsaturated, aromatic, or heteroaromatic. More specifically, $R_{a1}$, $R_{a2}$, $R_{b1}$, $R_{b2}$, $R_c$, $R_d$, and $R_e$ may each independently be a hydrogen atom, an alkyl group having 1 to 18 carbon atoms, a cycloalkyl group having 3 to 18 carbon atoms, or an aryl group having 6 to 14 carbon atoms. Even more specifically, $R_{a1}$, $R_{a2}$, $R_{b1}$, $R_{b2}$, $R_c$, $R_d$, and $R_e$ may each independently be an alkyl group having one to six carbon atoms, such as a methyl group or an ethyl group; a cyclohexyl group; or a phenyl group, where m and n are each independently an integer from 1 to 4.

More specifically, the silylating agent may be an alkyltrichlorosilane such as methyltrichlorosilane; a dialkyldichlorosilane such as dimethyldichlorosilane; a trialkylchlorosilane such as trimethylchlorosilane; a symmetric disiloxane or hexaalkyldisiloxane such as hexamethyldisiloxane; a trialkylmethoxysilane such as trimethylmethoxysilane; a silazane such as hexamethyldisilazane, or the like, or any one thereof or a mixture of two or more thereof.

Particles of the aerogel may exhibit hydrophobicity in whole or in part, depending on the degree of silylation. In this case, the hydrophobicity may be permanent.

Also, a part of the water present inside pores of the hydrogel may react with the silylating agent, which is a surface modifier, at the time of the surface modification reaction. Accordingly, in the aerogel that had been surface silylated using the silylating agent, the internal surface contains only Si—R groups or Si—OH groups but not Si—OR groups (here, R is an alkyl group). Specifically, a hydrogel containing Si—OH groups on the internal surface thereof provides Si—O—Si(R)$_3$ groups as a result of complete or partial engagement in a reaction on the internal surface of the hydrogel upon surface silylation using trialkylchlorosilane or hexaalkyldisiloxane as a silylating agent. Generally, the presence of an organic solvent during silylation adds the organic solvent to reactive OH groups of the gel. However, since the aforementioned hydrogel does not contact an alcohol (e.g., methanol, ethanol, isopropanol), a ketone (e.g., acetone), an ether (e.g., dimethoxyethane), or a reactive solvent such as tetrahydrofuran throughout the whole process, Si—OR groups cannot be formed on the internal surface of the gel.

Accordingly, the surface silylated aerogel powder may have the following characteristics i) or ii):

i) The surface silylated aerogel powder does not contain Si—OR groups (R is an alkyl group having 1 to 18 carbon atoms)

ii) The surface silylated aerogel powder has been surface modified to such a degree that the degree of coverage, or the degree of cladding, of the internal surface by the organic surface group introduced through surface silylation is no less than 90% of the theoretically possible value. Specifically, the degree of coverage by a trimethylsilyl group is 2.5 or more per nm$^2$.

In the present invention, "degree of coverage" refers to the number of organic surface groups per square nanometers of the internal surface area of the aerogel. The theoretically possible degree of coverage can be calculated according to the following Equation 1.

Degree of coverage=[C]/[BET]*K; unit:[nm$^{-2}$]

In the above equation, $K = 6.022 \times 10^{23} / 100 \times 12 \times 3 \times 10^{18} = 167.28$; unit: $[g^{-1}]$

[C]: Carbon content (wt %)
[BET]: BET surface area; unit: [m$^2$/g]

The actual degree of coverage may have a less than 10% margin of error depending on the measurement method, and the internal surface area may be measured by nitrogen adsorption according to the BET method (the multipoint BET method in accordance with DIN66131, ASAP 2010 from Micromeritics Instrument Corp.).

The aforementioned degree of coverage was described using trimethylsilyl-modified aerogel, but the present invention is not limited thereto.

In addition, according to one embodiment of the present invention, the aerogel powder mixed with the aforementioned silica sol to produce the aerogel precursor may be a hydrophobic silica aerogel powder having a carbon content of 10 to 12 parts by weight with respect to the entire weight of the aerogel powder. When the carbon content in the aerogel powder is out of the above range, the produced aerogel blanket may exhibit low hydrophobicity on the inside thereof and, as a result, the hydrophobicity retention ability thereof may deteriorate in a high-temperature application.

The method for producing the aerogel powder is not particularly limited as long as it satisfies the hydrophobicity condition of the aerogel powder. Specifically, the hydrophobic silica aerogel powder may be produced by sequentially carrying out gelation of silica sol, surface modification using a surface modifier having a hydrophobic functional group such as hexamethyldisilazane (HMDS), and drying. When water is the solvent used for producing the silica sol, an optional solvent replacement process using an alcohol, such as methanol, may be additionally performed after gelation.

The aerogel powder may be used in an amount of 25 to 50 parts by weight with respect to 100 parts by weight of silica contained in silica sol. When the amount of the aerogel powder used is less than 25 parts by weight with respect to 100 parts by weight of silica, the internal hydrophobicity may be improved only insignificantly, and the hydrophobicity may not be retained in a high-temperature application. Also, when more than 50 parts by weight of the aerogel powder with respect to 100 parts by weight of silica is used, binding of the aerogel powder may deteriorate due to a decrease in relative silica sol content, thus causing the aerogel powder to come off during the production of a blanket and eventual degradation of thermal insulation performance.

Next, the process 2) in the method for producing an aerogel blanket according to one embodiment of the present invention is a process for producing a composite of wet gel and the blanket substrate in which aerogel in a wet gel form and the blanket substrate are combined into a composite, and may be carried out by adding a basic catalyst to the aerogel precursor produced by the process 1), depositing the mixture onto the blanket substrate, and then carrying out gelation.

The type of the blanket substrate may vary depending on the use of the blanket. Specifically, the blanket substrate may be a film, a sheet, a net, a fiber, a porous body, foam, a nonwoven fabric, or a lamination of two or more thereof. In addition, surface roughness may be formed or patterned on the surface depending on the application.

Also, when the blanket substrate is a fiber, it may specifically be a glass fiber, a carbon fiber, a polyimide fiber or the like, and a mixture of one or more thereof may be used depending on the need.

According to one embodiment of the present invention, the blanket substrate may specifically be a reinforcing structure including a lofty fibrous batting sheet therein, and more specifically a lofty fibrous batting. In this case, the fibers may be oriented along all three axes, the batting may be in a sheet form, the lofty fibrous batting may be compressible to at least 50% of its original thickness and recoverable to at least 70% of the original thickness after five seconds of compression, the lofty fibrous batting may have a density of 0.001 to 0.26 g/cm$^3$, and the cross-sectional area of fibers identifiable from a cross-section of the final aerogel blanket product may be less than 10% of the entire cross-sectional area.

The batting refers to a fibrous material layer or sheet used as a blanket for thermal insulation. The fibers for producing a batting may be thin, specifically having a denier of 15 or less, and more specifically 10 or less. In addition, the cross-sectional area of the fibers may be less than 10%, specifically less than 8%, and more specifically less than 5% of the entire cross-sectional area of the final blanket product.

Even more specifically, the reinforcing structure may be selected from the group consisting of a polyester batting reinforcing structure; a polyester fiber batting containing a polyvinyl alcohol binder; a lofty silica fiber structure; a fiber laminate of polyester/silicon carbide/copper mesh/silicon carbide/polyester; a laminate of a polyester batting/unidirectional carbon fibers containing a polymerizable binder/copper mesh/lofty polyester batting; and a laminate of silica felt/stainless steel mesh/silica felt.

When a basic catalyst is added to the aerogel precursor produced in the process 1) and the mixture is deposited onto the blanket substrate, gelation occurs and an aerogel in the form of a wet gel is formed on the surface and inside of the blanket substrate, resulting in the formation of a wet gel-substrate composite.

In this case, the basic catalyst may serve to control the pH to promote gelation.

Specifically, the pH controlling process may be carried out using the basic catalyst such that the pH of the aerogel precursor deposited onto the blanket substrate is adjusted to 4 to 9. In this case, ammonia, etc. may be used as the basic catalyst. More specifically, the basic catalyst may be used in an amount of 0.05 to 10 vol %, and more specifically 0.1 to 1 vol %, based on the total volume of the aerogel precursor.

In addition, a method for producing an aerogel blanket according to one embodiment of the present invention may further include, after the process 2), a process of aging the wet gel of the produced wet gel-substrate composite to make sure that the chemical change to the wet gel is fully accomplished.

In this case, the aging may be performed by keeping the aerogel in the form of a wet gel at a suitable temperature for an extended period of time. Specifically, the aging may be performed by keeping the wet gel in 90 to 110 parts by volume of an alcohol with respect to the volume of the wet gel at a temperature of 50 to 70° C. for 30 minutes to three hours. When the aging is carried out under the above conditions, the network structure in the wet gel may be strengthened, thus resulting in the strengthening of the produced aerogel blanket.

Next, in a method for producing an aerogel blanket according to one embodiment of the present invention, the process 3) is a process for producing a hydrophobic wet gel-substrate composite, and may be performed by surface modifying the wet gel in the wet gel-substrate composite produced in the process 2).

Specifically, the surface modification may be carried out using a solution in which a surface modifier is dissolved in an organic solvent. More specifically, the solution may be produced by adding the surface modifier into the organic solvent in a ratio of 2.5 to 7.5 vol % based on the total volume of the solution and then performing mixing. When the surface modifier and organic solvent are contained in the above ratio, the surface and internal pores of the wet gel may be easily surface modified to exhibit hydrophobicity, and the solvent on the inside may be replaced, causing the surface tension to be lowered, and preventing cracks in the subsequent heat treatment process. More specifically, the surface modification may be carried out using a solution produced by adding a surface modifier to an organic solvent in a ratio of 5 to 7.5 vol %.

In addition, the surface modifier may specifically be a silane-based compound, a silazane-based compound, a siloxane-based compound, or the like, and more specifically one or more selected from the group consisting of trimethylchlorosilane, methyltrimethoxysilane, phenyltriethoxysilane, dimethylchlorosilane, trimethylethoxysilane, hexamethyldisilazane, and polydimethylsiloxane, but the present invention is not limited thereto.

Also, specific examples of the organic solvent include an alcohol-based solvent such as ethanol and isopropyl alcohol; or a hydrocarbon-based solvent such as n-hexane, heptane, toluene, or xylene. A single solvent or a mixture of two or more solvents among the above may be used as the organic solvent.

Meanwhile, the solution containing the surface modifier may be used in an amount of 70 to 100 parts by volume with respect to 100 parts by volume of the wet gel. Surface modification and solvent replacement may not be completely achieved when the amount of the solution used is less than 70 parts by weight, and the use of an excessive amount of the solution exceeding 100 parts by weight may be uneconomical.

The surface modification may be carried out more specifically by adding the solution containing the surface modifier to the wet gel-substrate composite produced in the process 2), and then keeping the mixture at a temperature of 50 to 80° C. for one to ten hours, more specifically at a temperature of 60 to 70° C. for four to five hours.

Through such a surface modification process, the aerogel distributed on the surface and inside of the blanket substrate attains hydrophobicity.

In addition, the method for producing an aerogel blanket according to one embodiment of the present invention may optionally include an additional solvent replacement process after surface modification when the subsequent drying process is to be performed by ambient drying.

The solvent replacement process may be carried out by adding an organic solvent after the surface modification process to replace the solvent in the hydrophobic aerogel with the organic solvent. In this case, a hydrocarbon-based solvent or the like may be used as the organic solvent.

Next, the process 4) in the method for producing an aerogel blanket according to one embodiment of the present invention is a process for producing the final aerogel blanket of the present invention by drying the hydrophobic wet gel-substrate composite produced in the process 3).

The drying process may be performed specifically through a supercritical drying process using supercritical carbon dioxide or an ambient drying process.

Carbon dioxide ($CO_2$) is in a gaseous state at normal temperature and pressure, but above a particular limit of temperature and pressure referred to as the critical point, it reaches a critical state where evaporation does not occur and the gas phase and the liquid phase cannot be distinguished. The carbon dioxide in such a critical state is referred to as supercritical carbon dioxide. The supercritical carbon dioxide has a molecular density close to that of a liquid but has a property close to that of a gas due to low viscosity. By having a high diffusion rate and high thermal conductivity, the supercritical carbon dioxide has high drying efficiency and thus may shorten the drying process.

The supercritical drying process may be carried out according to a conventional method except that it uses the silica gel-substrate composite produced in the process 2). Specifically, the supercritical drying process includes a solvent replacement process in which a surface modified hydrophobic aerogel-substrate composite is introduced into a supercritical drying reactor, liquid $CO_2$ fills the supercritical drying reactor, and the alcohol solvent inside the aerogel is replaced with $CO_2$. Thereafter, the temperature is raised at a constant rate, specifically at a rate of 0.1 to 1° C./min, to 40 to 50° C., and then the pressure equal to or above the pressure at which carbon dioxide reaches a supercritical state, specifically a pressure of 100 to 150 bars, is maintained so that the supercritical state of carbon dioxide is maintained for a particular duration, specifically for 20 minutes to one hour. Generally, carbon dioxide reaches the supercritical state at a temperature of 31° C. and a pressure of 73.8 bars. The particular temperature and pressure at which carbon dioxide reaches the supercritical state may be maintained for 2 hours to 12 hours, more specifically for two hours to six hours, and then the pressure may be slowly removed to complete the supercritical drying process.

In addition, the ambient drying process may be carried out by a conventional method such as natural drying or hot air drying under normal pressure (1±0.3 atm). Specifically, the process may be carried out at a temperature of 50 to 150° C. for 12 hours to 24 hours.

The above production method produces a high-temperature superhydrophobic aerogel blanket capable of retaining excellent hydrophobicity even at high temperatures. By attaining hydrophobicity in the internal structure as well as on the surface thereof, the aerogel blanket may exhibit excellent hydrophobicity retention ability even in a high-temperature application.

According to another embodiment of the present invention, the present invention provides an aerogel blanket produced by the above production method.

The aerogel contained in the aerogel blanket produced by the production method according to the present invention may have a high carbon content retention ratio compared to a conventional aerogel and a low thermal conductivity growth rate compared to a conventional aerogel blanket even upon heat treatment at a temperature equal to or greater than 400° C. and less than 500° C.

Specifically, the aerogel blanket according to the present invention may include an aerogel and a blanket substrate therein, and the aerogel may have a carbon content retention ratio calculated according to the following Equation 2 and satisfying at least any one of 1) to 5) described below when heat-treated at a temperature equal to or greater than 400° C. and less than 500° C. for one to five hours. Preferably, in this case, the carbon content retention ratio of the aerogel satisfies all of 1) to 5).

Carbon content retention ratio (%)=(carbon content (wt %) in aerogel after heat treatment)/(initial carbon content in aerogel (wt %))  [Equation 2]

1) 75% or more upon one-hour heat treatment
2) 65% or more upon two-hour heat treatment
3) 60% or more upon three-hour heat treatment
4) 59% or more upon four-hour heat treatment
5) 58% or more upon five-hour heat treatment More specifically, the aerogel according to the present invention may have a carbon content retention ratio satisfying at least any one of 1) to 5) described below when heat-treated at a temperature equal to or greater than 400° C. and less than 500° C. for one to five hours. Preferably, in this case, the carbon content retention ratio of the aerogel satisfies all of 1) to 5).

1) 75% to 80% upon one-hour heat treatment
2) 65% to 75% upon two-hour heat treatment
3) 60% to 70% upon three-hour heat treatment
4) 59% to 65% upon four-hour heat treatment
5) 58% to 64% upon five-hour heat treatment Also, the aerogel blanket may have a thermal conductivity growth rate calculated according to the following Equation 3 and satisfying at least any one of 1) to 5) described below when heat-treated at a temperature equal to or greater than 400° C. and less than 500° C. for one to five hours. Preferably, in this case, the thermal conductivity growth rate of the aerogel blanket satisfies all of 1) to 5).

Thermal conductivity growth rate (%)=(thermal conductivity (mW/mK) of aerogel blanket at 25° C. after heat treatment)/(initial thermal conductivity (mW/mK) of aerogel blanket at 25° C.)  [Equation 3]

1) 6% or less upon one-hour heat treatment
2) 10% or less upon two-hour heat treatment
3) 11% or less upon three-hour heat treatment
4) 12% or less upon four-hour heat treatment
5) 13% or less upon five-hour heat treatment More specifically, the aerogel blanket according to the present invention may have a thermal conductivity growth rate satisfying at least any one of 1) to 5) described below when heat-treated at a temperature equal to or greater than 400° C. and less than 500° C. for one to five hours. Preferably, in this case, the thermal conductivity growth rate of the aerogel blanket satisfies all of 1) to 5).

1) 5% to 6% upon one-hour heat treatment
2) 7% to 10% upon two-hour heat treatment
3) 8% to 11% upon three-hour heat treatment
4) 9% to 12% upon four-hour heat treatment
5) 10% to 13% upon five-hour heat treatment The aerogel contained in the aerogel blanket produced by the production method according to the present invention may have a high carbon content retention ratio compared to a conventional aerogel and a low thermal conductivity growth rate compared to a conventional aerogel blanket even upon heat treatment at a temperature of 500 to 600° C.

Specifically, the aerogel blanket according to the present invention may include an aerogel and a blanket substrate therein, and the aerogel may have a carbon content retention ratio of 13% or more as calculated according to the following Equation 2 when heat-treated at a temperature of 500 to 600° C. for one to five hours.

Carbon content retention ratio (%)=(carbon content (wt %) in aerogel after heat treatment)/(initial carbon content in aerogel (wt %))  [Equation 2]

More specifically, the aerogel according to the present invention may have the carbon content retention ratio of 15% or more. In this case, the carbon content retention ratio is preferably 13% to 70%, and more preferably 15% to 60%.

Even more specifically, the aerogel according to the present invention may have a carbon content retention ratio satisfying at least any one of 1) to 5) described below when heat-treated at a temperature of 500 to 600° C. for one to five hours. Preferably, in this case, the carbon content retention ratio of the aerogel satisfies all of 1) to 5).

1) 40% or more upon one-hour heat treatment
2) 24% or more upon two-hour heat treatment
3) 20% or more upon three-hour heat treatment 4) 17% or more upon four-hour heat treatment
5) 15% or more upon five-hour heat treatment Even more specifically, the aerogel according to the present invention may have a carbon content retention ratio satisfying at least any one of 1) to 5) described below when heat-treated at a temperature of 500 to 600° C. for one to five hours. Preferably, in this case, the carbon content retention ratio of the aerogel satisfies all of 1) to 5).

1) 40% to 60% upon one-hour heat treatment
2) 24% to 50% upon two-hour heat treatment
3) 20% to 45% upon three-hour heat treatment
4) 17% to 42% upon four-hour heat treatment
5) 15% to 40% upon five-hour heat treatment In addition, the aerogel blanket according to the present invention may have a thermal conductivity growth rate calculated according to the following Equation 3 of 17% or less when heat-treated at a temperature of 500 to 600° C. for one to five hours.

Thermal conductivity growth rate (%)=(thermal conductivity (mW/mK) of aerogel blanket at 25° C. after heat treatment)/(initial thermal conductivity (mW/mK) of aerogel blanket at 25° C.)   [Equation 3]

As described above, the aerogel blanket according to the present invention exhibits a high carbon content retention ratio and a low thermal conductivity growth rate even upon heat treatment at high temperature and thus can retain excellent thermal insulation performance.

This is because the use of a mixture of silica sol and a hydrophobic aerogel powder as an aerogel precursor can result in hydrophobicity in the internal structure as well as on the surface of the aerogel included in the aerogel blanket. Accordingly, the aerogel blanket can attain high hydrophobicity, and thus exhibits excellent hydrophobicity retention ability even upon heat treatment at high temperature.

In addition, the aerogel blanket according to the present invention may have a density of 130 to 200 g/cm³ and a porosity of 80 to 99%. In this case, the density of the aerogel blanket may be measured using a tap density volumeter (Engelsman Model STAY II), and the porosity may be measured through a specific surface area method using 3Flex from Micrometrics Instrument Corp.

The aerogel blanket having such high hydrophobicity can retain low thermal conductivity even at high temperature such that it can be used in various fields such as thermal insulation materials, extremely-low dielectric films, catalysts, catalyst carriers, or blankets. Particularly, the aerogel blanket can retain low thermal conductivity due to the aforementioned physical property/porosity, and thus may be useful for the production of a thermal insulation material.

Hereinafter, the present invention will be described in greater detail with reference to examples. However, the following examples are for illustrative purposes only and are not intended to limit the scope of the invention.

Example 1

A hydrochloric acid solution diluted in water (concentration=0.15%) was added to a mixed solution (silica content=4 wt %) produced by mixing TEOS and ethanol in a weight ratio of 3:1 such that the pH of the mixed solution reached 1, and the substances were mixed to produce silica sol. Subsequently, an aerogel powder was mixed with 140 ml of the produced silica sol such that the aerogel powder was mixed in an amount of 25 parts by weight with respect to 100 parts by weight of silica in the silica sol to produce an aerogel precursor. In this case, the aerogel powder had been produced by producing silica sol using TEOS, followed by gelation of the silica sol and surface modification of the same using HMDS (carbon content: 11 wt % of the total weight of the aerogel powder). Next, an ammonia catalyst was added to the produced aerogel precursor in an amount of 0.5 vol % based on the total volume of the aerogel precursor, glass fibers were immersed in the mixture, and gelation was performed to produce a wet gel-substrate composite. Subsequently, the produced wet gel-substrate composite was kept in ethanol at a temperature of 70° C. for two hours for aging. Thereafter, a surface modifier solution produced by mixing polydimethylsiloxane and ethanol in a volume ratio of 1:19 was added in an amount of 90 parts by volume with respect to 100 parts by volume of the wet gel, and surface modification was performed at 70° C. for five hours to produce a hydrophobic wet gel-substrate composite. Thereafter, the hydrophobic wet gel-substrate composite was introduced into an extractor in supercritical equipment, supercritical drying was performed using supercritical $CO_2$, and heat treatment was carried out at 150° C. for one hour to produce an aerogel blanket.

Example 2

An aerogel blanket was produced in the same manner as in Example 1 except that the aerogel powder was used in an amount of 50 parts by weight with respect to 100 parts by weight of silica to produce the aerogel precursor.

Example 3

An aerogel blanket was produced in the same manner as in Example 1 except that the hydrophobic wet gel-substrate composite was dried under 1±0.3 atm and at a temperature of 120° C. for 12 hours.

Example 4

0.5 L of an acidic ion-exchange resin (Duolite™ C20) based on a sulfonated styrene-divinylbenzene copolymer was added to 1 L of a sodium water glass solution ($SiO_2$ content=7 wt %, $Na_2O:SiO_2$ molar ratio=1:3.3), and the mixture was stirred (pH 2.7). The ion-exchange resin was separated from the resulting mixture by filtration, and the pH was adjusted to 4.7 by adding a 1 M NaOH solution. The resulting gel was aged at 85° C. for six hours, and then water was extracted therefrom using 3 L of acetone. Chloropropyltrichlorosilane was added to the resulting acetone-containing gel in an amount of 50 mg per 1 g of the acetone-containing gel, and the mixture was allowed to react for five hours and then was washed with 1 L of acetone. The resulting gel was dried under an air atmosphere at 40° C. for three hours, 50° C. for two hours, and 150° C. for 12 hours in sequence to produce a surface functionalized aerogel powder (aerogel density=0.152 g/cm³, BET specific surface area=638 m²/g, carbon content: 10.2 wt % of the total weight of the aerogel powder).

An aerogel blanket was produced in the same manner as in Example 1 except that the surface functionalized aerogel powder produced as described above was used.

Example 5

424 g of a 7.5% hydrochloric acid solution was cooled to 10° C., 712 g of a sodium water glass solution (containing 13 wt % of silicon dioxide, sodium oxide:silicon dioxide=1:3.3) was added in a dropwise manner thereto, and then the mixture was cooled to 10° C. In this case, the pH was set to 4.7. The resulting hydrogel was kept at 85° C. for 30 minutes or longer and then was washed with 3 L of hot water. For subsequent silylation, 1 L of hexamethyldisiloxane (HMDSO) and 100 ml of a concentrated hydrochloric acid solution were heated in a flask to boiling, treated with a high-temperature nitrogen jet (50 l/h, 100° C.) for about 30 minutes or longer followed by heating to 80° C., and the wet gel (150 ml) was passed therethrough. Thereafter, the resulting gel was dried using a high-temperature nitrogen jet (1500 l/h, 200° C.) for one hour to obtain an aerogel powder (aerogel density=0.124 g/cm$^3$, BET specific surface area=685 m$^2$/g, carbon content: 12.3 wt % of the total weight of the aerogel powder, degree of coverage=3.0 nm$^{-2}$)

An aerogel blanket was produced in the same manner as in Example 1 except that the aerogel powder produced as described above was used.

Example 6

2 L of a sodium water glass solution (containing 6 wt % silicon dioxide, sodium oxide:silicon dioxide=1:3.3) was passed through a jacketed glass column (length=100 cm, diameter=8 cm) filled with 4 L of an acidic ion-exchange resin (Duolite™ C20) based on a sulfonated styrene-divinylbenzene copolymer at a rate of about 70 ml/min. The column was operated at about 7° C. A 1.0 M sodium hydroxide solution was introduced to the resulting silica solution (pH 2.3) flowing out from the bottom end of the column until the pH reached 4.7 and was kept at 85° C. for three hours to carry out condensation polymerization. The resulting gel was washed with a concentrated aqueous hydrochloric acid solution until a hydrochloric acid solution accounted for 10% of the liquid content in the pores of the gel. For subsequent silylation, 100 g of the resulting hydrogel was suspended in 100 ml of HMDSO, and then 31.5 g (42 ml) of trimethylchlorosilane (TMCS) was added thereto. An aqueous phase (120 ml of concentrated HCl) was formed under the HMDSO within one hour as a result of gas (HCl) release. The resulting hydrophobized gel was separated from the HMDSO phase and was dried with a high-temperature nitrogen jet (1500 l/h, 200° C.) for one hour to obtain an aerogel powder (aerogel density=0.101 g/cm$^3$, BET specific surface area=728 m$^2$/g, carbon content: 11.2 wt % of the total weight of the aerogel powder, degree of coverage=2.5 nm$^{-2}$)

An aerogel blanket was produced in the same manner as in Example 1 except that the aerogel powder produced as described above was used.

Example 7

2 L of a sodium water glass solution (containing 6 wt % silicon dioxide, sodium oxide:silicon dioxide=1:3.3) was passed through a jacketed glass column (length=100 cm, diameter=8 cm) filled with 4 L of an acidic ion-exchange resin (Duolite™ C20) based on a sulfonated styrene-divinylbenzene copolymer at a rate of about 70 ml/min. The column was operated at about 7° C. A 1.0 M sodium hydroxide solution was introduced to the resulting silica solution (pH 2.3) flowing out from the bottom end of the column until the pH reached 4.7, and was kept at 85° C. for three hours to carry out condensation polymerization. For subsequent silylation, 1 L of trimethylsiloxane ((CH$_3$)$_3$SiOH) and 100 ml of a concentrated hydrochloric acid solution were heated in a flask to boiling, the resulting gas mixture was treated with a high-temperature nitrogen jet (50 l/h, 100° C.) for about 30 minutes or longer followed by heating to 80° C., and the wet gel (150 ml) was passed therethrough. Thereafter, the resulting gel was dried using a high-temperature nitrogen jet (1500 l/h, 200° C.) for one hour to obtain an aerogel powder (aerogel density=0.128 g/cm$^3$, BET specific surface area=645 m$^2$/g, carbon content: 11.8 wt % of the total weight of the aerogel powder, degree of coverage=2.4 nm$^{-2}$).

An aerogel blanket was produced in the same manner as in Example 1 except that the aerogel powder produced as described above was used.

Example 8

An aerogel blanket was produced in the same manner as in Example 1 except that a reinforcing structure based on a lofty silica fiber structure (Quartzel® from Saint-Gobain Quartz Ltd.) having a density of 65 g/m$^2$ and containing a polyvinyl alcohol binder was used as a blanket substrate instead of a polyester fiber batting.

Comparative Example 1

An aerogel blanket was produced in the same manner as in Example 1 except that an aerogel powder was not added in the production of an aerogel precursor.

Comparative Example 2

An aerogel blanket was produced in the same manner as in Example 1 except that a hydrophilic precipitated silica powder (SIPERNAT® 22 S from Evonik Industries) was used instead of an aerogel powder in the production of an aerogel precursor.

Experimental Example 1

Comparative Analysis of Carbon Content

Figure 2:
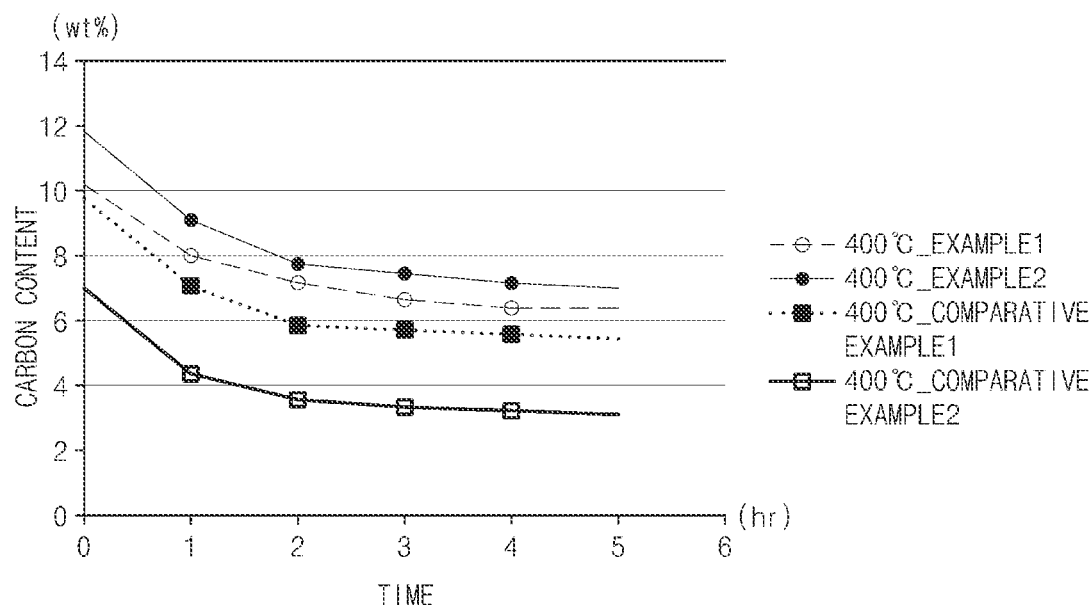
FIG. 2 is a graph for illustrating carbon content in aerogels of examples and comparative examples, the carbon content measured after heat treatment of the aerogels for one to five hours at 400° C.
Figure 3:
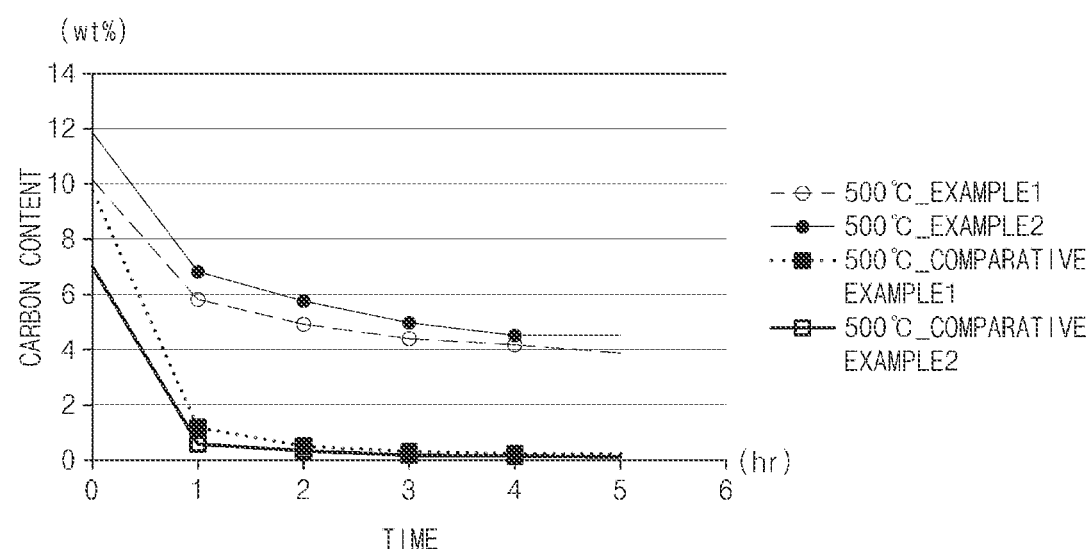
FIG. 3 is a graph for illustrating carbon content in aerogels of examples and comparative examples, the carbon content measured after heat treatment of the aerogels for one to five hours at 500° C.
Figure 4:
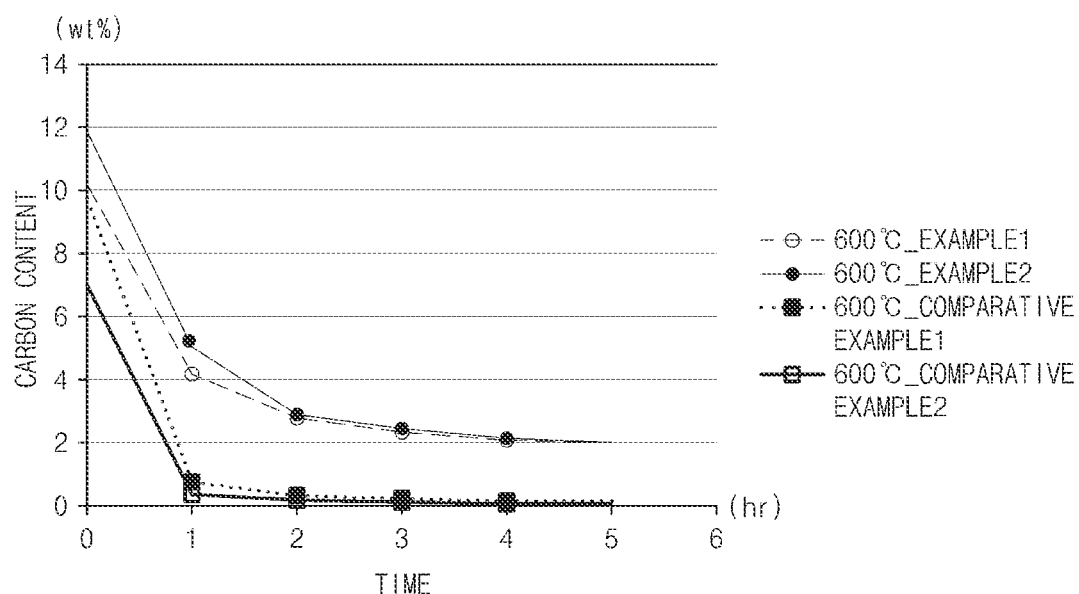
FIG. 4 is a graph for illustrating carbon content in aerogels of examples and comparative examples, the carbon content measured after heat treatment of the aerogels for one to five hours at 600° C.

The initial carbon content of each aerogel produced according to the examples and comparative examples was measured, and the carbon content of each aerogel after heat treatment at a temperature of 400° C., 500° C., and 600° C. for one to five hours was measured. The carbon content retention ratio was calculated based on the above measurements and the result is shown in FIGS. 2 to 4 and Tables 1 to 3. Meanwhile, the carbon content was measured using a carbon analyzer (CS-800 from ELTRA GmbH).

Carbon content retention ratio (%)=(carbon content (wt %) in aerogel after heat treatment)/(initial carbon content in aerogel (wt %))

TABLE 1

| Heat | | Example 1 | | Example 2 | | Comparative Example 1 | | Comparative Example 2 | |
|---|---|---|---|---|---|---|---|---|---|
| Temperature (° C.) | treatment time (hr) | Carbon content | Carbon content retention ratio | Carbon content | Carbon content retention ratio | Carbon content | Carbon content retention ratio | Carbon content | Carbon content retention ratio |
| 400 | 0 | 10.1 | 100 | 11.84 | 100 | 9.78 | 100 | 6.98 | 100 |
| | 1 | 8.01 | 79.30 | 9.1 | 76.85 | 7.12 | 72.80 | 4.32 | 61.89 |

TABLE 1-continued

| Temperature (° C.) | Heat treatment time (hr) | Example 1 Carbon content | Example 1 Carbon content retention ratio | Example 2 Carbon content | Example 2 Carbon content retention ratio | Comparative Example 1 Carbon content | Comparative Example 1 Carbon content retention ratio | Comparative Example 2 Carbon content | Comparative Example 2 Carbon content retention ratio |
|---|---|---|---|---|---|---|---|---|---|
| | 2 | 7.2 | 71.28 | 7.74 | 65.37 | 5.9 | 60.32 | 3.56 | 51.00 |
| | 3 | 6.71 | 66.43 | 7.43 | 62.75 | 5.75 | 58.79 | 3.3 | 47.27 |
| | 4 | 6.41 | 63.46 | 7.11 | 60.05 | 5.66 | 57.87 | 3.21 | 45.98 |
| | 5 | 6.4 | 63.36 | 7.01 | 59.20 | 5.5 | 56.23 | 3.1 | 44.41 |

TABLE 2

| Temperature (° C.) | Heat treatment time (hr) | Example 1 Carbon content | Example 1 Carbon content retention ratio | Example 2 Carbon content | Example 2 Carbon content retention ratio | Comparative Example 1 Carbon content | Comparative Example 1 Carbon content retention ratio | Comparative Example 2 Carbon content | Comparative Example 2 Carbon content retention ratio |
|---|---|---|---|---|---|---|---|---|---|
| 500 | 0 | 10.1 | 100 | 11.84 | 100 | 9.78 | 100 | 6.98 | 100 |
| | 1 | 5.81 | 57.52 | 6.74 | 56.92 | 1.2 | 12.26 | 0.56 | 8.02 |
| | 2 | 4.9 | 48.51 | 5.75 | 48.56 | 0.5 | 5.11 | 0.34 | 4.87 |
| | 3 | 4.42 | 43.76 | 5 | 42.22 | 0.3 | 3.06 | 0.19 | 2.72 |
| | 4 | 4.14 | 40.99 | 4.48 | 37.83 | 0.22 | 2.24 | 0.15 | 2.14 |
| | 5 | 3.95 | 39.10 | 4.5 | 38.00 | 0.19 | 1.94 | 0.11 | 1.57 |

TABLE 3

| Temperature (° C.) | Heat treatment time (hr) | Example 1 Carbon content | Example 1 Carbon content retention ratio | Example 2 Carbon content | Example 2 Carbon content retention ratio | Comparative Example 1 Carbon content | Comparative Example 1 Carbon content retention ratio | Comparative Example 2 Carbon content | Comparative Example 2 Carbon content retention ratio |
|---|---|---|---|---|---|---|---|---|---|
| 600 | 0 | 10.1 | 100 | 11.84 | 100 | 9.78 | 100 | 6.98 | 100 |
| | 1 | 4.15 | 41.08 | 5.05 | 42.65 | 0.7 | 7.15 | 0.29 | 4.15 |
| | 2 | 2.84 | 28.11 | 2.89 | 24.40 | 0.3 | 3.06 | 0.21 | 3.00 |
| | 3 | 2.42 | 23.96 | 2.45 | 20.69 | 0.22 | 2.24 | 0.12 | 1.71 |
| | 4 | 2.12 | 20.99 | 2.15 | 18.15 | 0.12 | 1.22 | 0.08 | 1.14 |
| | 5 | 1.98 | 19.60 | 1.99 | 16.80 | 0.09 | 0.92 | 0.08 | 1.14 |

As shown in Tables 1 to 3, the aerogels of Examples 1 and 2, in which an aerogel precursor was produced by adding a hydrophobic aerogel powder to silica sol, have a high carbon content retention ratio comparing before and after heat treatment, as compared to the aerogel of Comparative Example 1 in which no aerogel powder was added in the production of an aerogel precursor. In particular, the difference of the carbon content retention ratio between Examples 1 and 2 and Comparative Example 1 is more significant when the heat treatment was performed within the first hour and at an ultra-high temperature of 500° C. or more.

In addition, in the case of Comparative Example 2, in which a precipitated silica powder was added instead of a hydrophobic aerogel powder in the production of an aerogel precursor, the carbon content retention ratio is not high compared to those of Comparative Example 1 as well as Examples 1 and 2, suggesting significantly inferior hydrophobicity retention ability at high temperatures.

The reason behind Examples 1 and 2 having a high carbon content retention ratio compared to Comparative Examples 1 and 2 is that producing a silica precursor by mixing a hydrophobic aerogel powder with silica sol resulted in a final aerogel product that is hydrophobic both on the surface and in the internal structure thereof. Accordingly, the aerogel blanket according to the present invention can be expected to have high hydrophobicity and excellent hydrophobicity retention ability at high temperatures compared to a conventional aerogel blanket.

Meanwhile, while Examples 1 and 2 are not significantly different in terms of the carbon content retention ratio, Example 2 has high carbon content compared to Example 1 in terms of an absolute amount of carbon. Therefore, it can be suggested that Example 2 retains higher hydrophobicity. This is due to the fact that Example 2 used a larger amount of a hydrophobic aerogel powder.

Compared to Comparative Example 1 in which a hydrophobic aerogel powder is not used, Example 1 is advantageous in that high hydrophobicity can be retained and, at the same time, thermal insulation performance is not degraded. Compared to Example 1, Example 2 has high hydrophobicity due to the use of a larger amount of a hydrophobic aerogel powder but is somewhat inferior in terms of thermal insulation performance Therefore, the amount of the hydrophobic aerogel powder to be added may be adjusted to produce an aerogel blanket more suitable for the application environment and use of the thermal insulation material.

Experimental Example 2

Comparative Analysis of Thermal Conductivity

Figure 5:
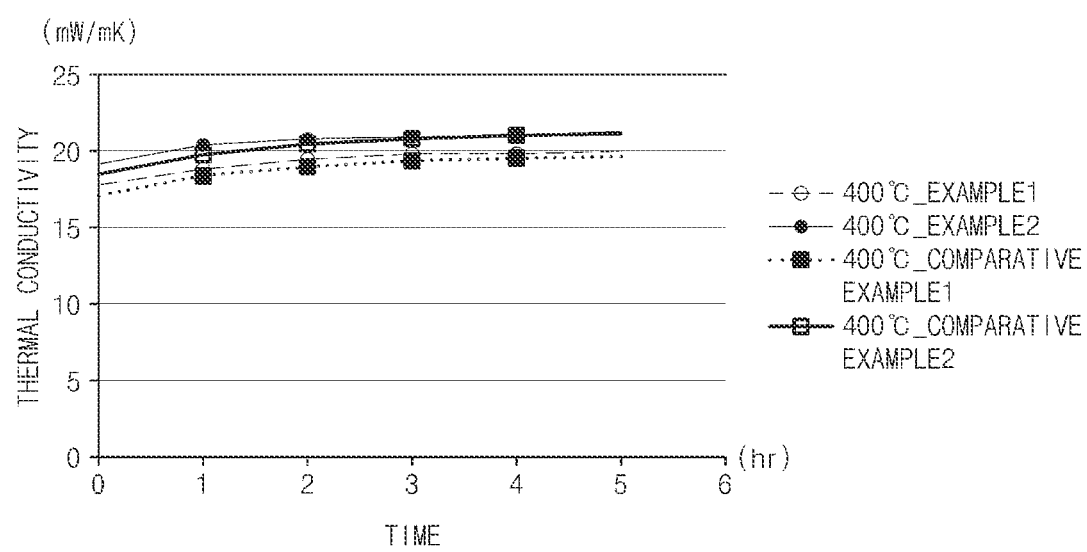
FIG. 5 is a graph for illustrating thermal conductivity of aerogel blankets of examples and comparative examples, the thermal conductivity measured after heat treatment of the aerogel blankets for one to five hours at 400° C.
Figure 6:
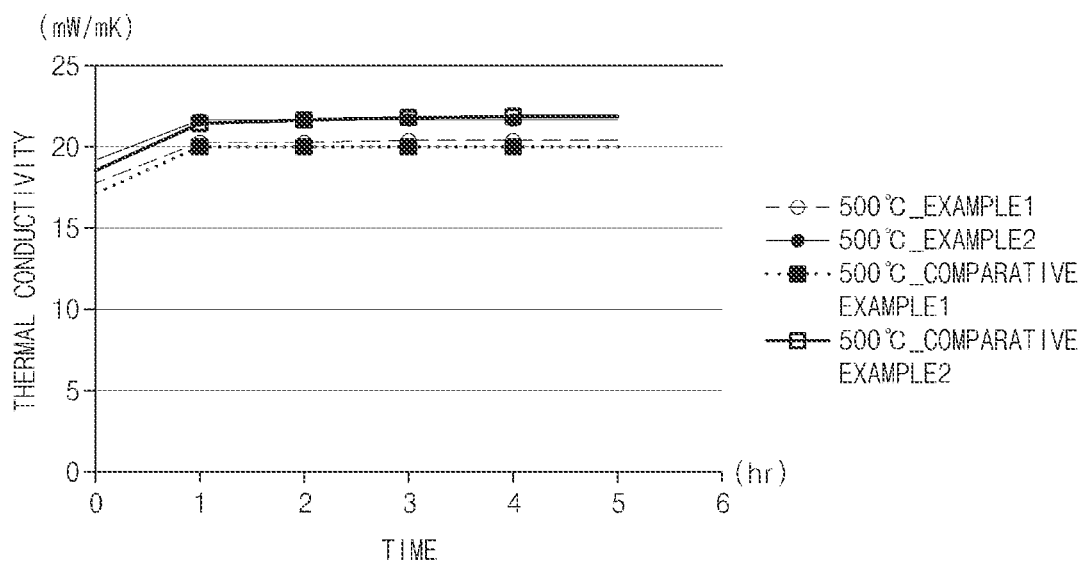
FIG. 6 is a graph for illustrating thermal conductivity of aerogel blankets of examples and comparative examples, the thermal conductivity measured after heat treatment of the aerogel blankets for one to five hours at 500° C.
Figure 7:
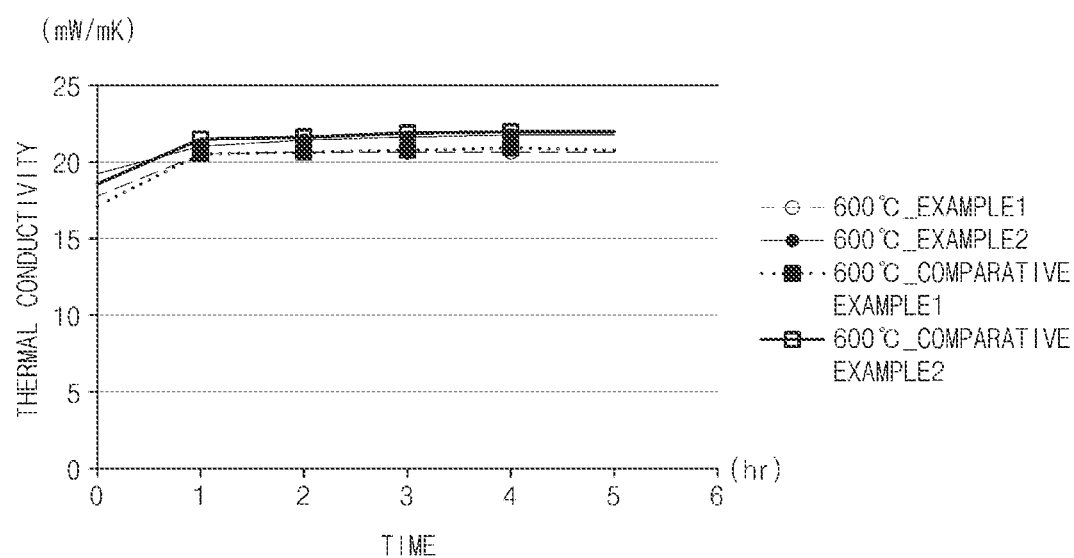
FIG. 7 is a graph for illustrating thermal conductivity of aerogel blankets of examples and comparative examples, the thermal conductivity measured after heat treatment of the aerogel blankets for one to five hours at 600° C.

The initial thermal conductivity of each aerogel blanket produced according to the examples and comparative examples was measured, and the thermal conductivity of each aerogel blanket after heat treatment at a temperature of 400° C., 500° C., and 600° C. for one to five hours was measured. The thermal conductivity growth rate was calculated based on the above measurements and the result is shown in FIGS. 5 to 7 and Tables 4 to 6. Meanwhile, the thermal conductivity was measured at room temperature (25° C.) using a thermal conductivity measuring device (HFM436 Lambda from NETZSCH).

Thermal conductivity growth rate (%)=(thermal conductivity (mW/mK) of aerogel blanket at 25° C. after heat treatment)/(initial thermal conductivity (mW/mK) of aerogel blanket at 25° C.)

This is due to the fact that the production of a silica precursor by mixing a hydrophobic aerogel powder with silica sol finally resulted in aerogel that has hydrophobicity both on the surface and in the internal structure thereof. Accordingly, the aerogel blanket according to the present invention can be expected to have excellent thermal insulation performance even in a high-temperature application compared to a conventional aerogel blanket.

Meanwhile, it was confirmed that in the case of Comparative Example 2, in which a hydrophilic powder was used instead of a hydrophobic powder, the thermal conductivity growth rate as well as the thermal conductivity is high such

TABLE 4

| | | Example 1 | | Example 2 | | Comparative Example 1 | | Comparative Example 2 | |
|---|---|---|---|---|---|---|---|---|---|
| Temperature (° C.) | Heat treatment time (hr) | Thermal conductivity | Thermal conductivity growth rate | Thermal conductivity | Thermal conductivity growth rate | Thermal conductivity | Thermal conductivity growth rate | Thermal conductivity | Thermal conductivity growth rate |
| 400 | 0 | 17.75 | 0 | 19.2 | 0 | 17.2 | 0 | 18.55 | 0 |
| | 1 | 18.8 | 5.91 | 20.35 | 5.98 | 18.45 | 7.26 | 19.8 | 6.73 |
| | 2 | 19.38 | 9.18 | 20.78 | 8.22 | 18.99 | 10.40 | 20.5 | 10.51 |
| | 3 | 19.65 | 10.70 | 20.92 | 8.95 | 19.38 | 12.67 | 20.89 | 12.61 |
| | 4 | 19.78 | 11.43 | 21.03 | 9.53 | 19.54 | 13.60 | 21.08 | 13.63 |
| | 5 | 19.9 | 12.11 | 21.2 | 10.41 | 19.7 | 14.53 | 21.1 | 13.74 |

TABLE 5

| | | Example 1 | | Example 2 | | Comparative Example 1 | | Comparative Example 2 | |
|---|---|---|---|---|---|---|---|---|---|
| Temperature (° C.) | Heat treatment time (hr) | Thermal conductivity | Thermal conductivity growth rate | Thermal conductivity | Thermal conductivity growth rate | Thermal conductivity | Thermal conductivity growth rate | Thermal conductivity | Thermal conductivity growth rate |
| 500 | 0 | 17.75 | 0 | 19.2 | 0 | 17.2 | 0 | 18.55 | 0 |
| | 1 | 20.22 | 13.91 | 21.6 | 12.50 | 20.2 | 17.44 | 21.45 | 15.63 |
| | 2 | 20.25 | 14.08 | 21.63 | 12.65 | 20.22 | 17.55 | 21.68 | 16.87 |
| | 3 | 20.33 | 14.53 | 21.65 | 12.76 | 20.23 | 17.61 | 21.79 | 17.46 |
| | 4 | 20.34 | 14.59 | 21.66 | 12.81 | 20.25 | 17.73 | 21.86 | 17.84 |
| | 5 | 20.38 | 14.81 | 21.7 | 13.02 | 20.25 | 17.73 | 21.91 | 18.11 |

TABLE 6

| | | Example 1 | | Example 2 | | Comparative Example 1 | | Comparative Example 2 | |
|---|---|---|---|---|---|---|---|---|---|
| Temperature (° C.) | Heat treatment time (hr) | Thermal conductivity | Thermal conductivity growth rate | Thermal conductivity | Thermal conductivity growth rate | Thermal conductivity | Thermal conductivity growth rate | Thermal conductivity | Thermal conductivity growth rate |
| 600 | 0 | 17.75 | 0 | 19.2 | 0 | 17.2 | 0 | 18.55 | 0 |
| | 1 | 20.47 | 15.32 | 21.02 | 9.47 | 20.58 | 19.65 | 21.54 | 16.11 |
| | 2 | 20.58 | 15.94 | 21.39 | 11.40 | 20.61 | 19.82 | 21.64 | 16.65 |
| | 3 | 20.66 | 16.39 | 21.55 | 12.23 | 20.77 | 20.75 | 21.89 | 18.00 |
| | 4 | 20.68 | 16.50 | 21.75 | 13.28 | 20.91 | 21.56 | 21.91 | 18.11 |
| | 5 | 20.65 | 16.33 | 21.71 | 13.07 | 20.85 | 21.22 | 21.98 | 18.49 |

As shown in Tables 4 to 6, the aerogel blankets of Examples 1 and 2, in which an aerogel precursor was produced by adding a hydrophobic aerogel powder to silica sol, do not have a high thermal conductivity growth rate comparing before and after heat treatment, as compared to the aerogel blanket of Comparative Example 1 in which no aerogel powder was added in the production of an aerogel precursor. In particular, the thermal conductivity did not significantly increase and the thermal insulation performance was relatively well maintained except within the first hour of heat treatment.

that the thermal insulation performance is not good compared to the case of Example 1.

Experimental Example 3

Comparative Analysis of Hydrophobicity Retention Ability (Furnace Test)

Figure 8:
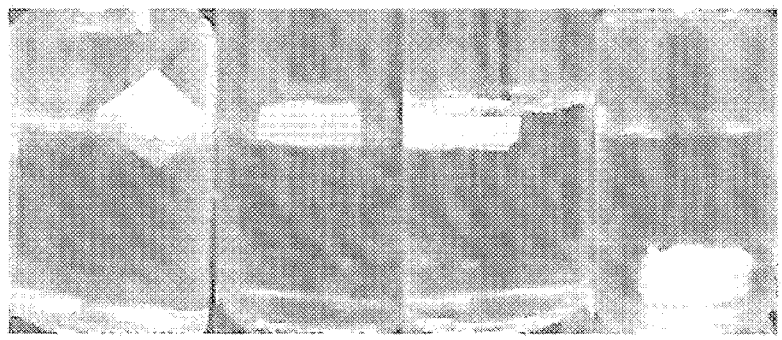
FIG. 8 is a set of images for comparatively analyzing hydrophobicity retention ability of aerogel blankets of examples and comparative examples after heat treatment of the aerogel blankets for one hour at 400° C.
Figure 9:
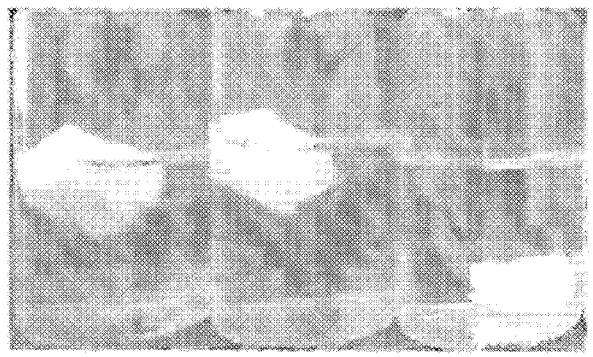
FIG. 9 is a set of images for comparatively analyzing hydrophobicity retention ability of aerogel blankets of examples and comparative examples after heat treatment of the aerogel blankets for one hour at 500° C.
Figure 10:
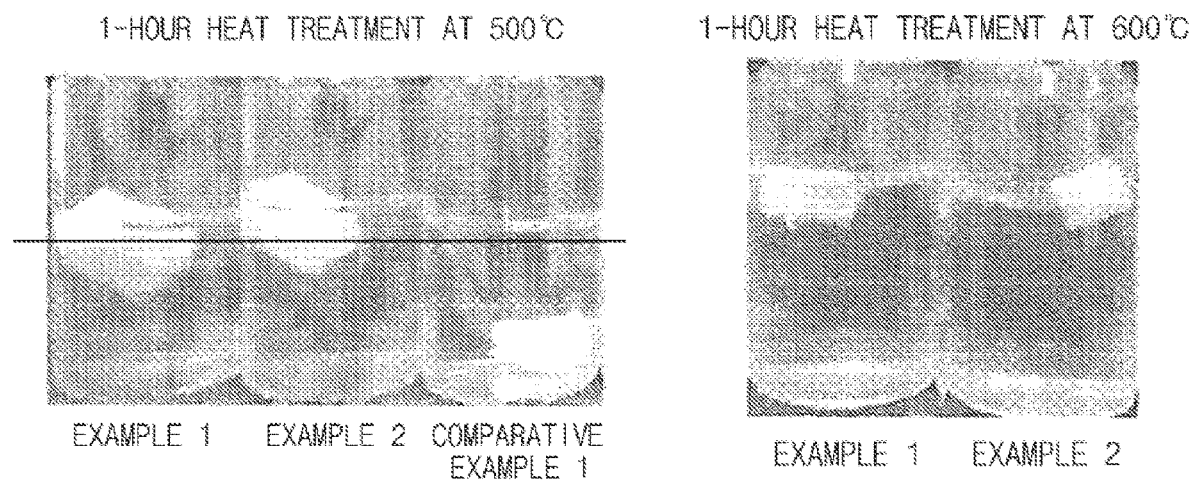
FIG. 10 is a set of images for comparatively analyzing hydrophobicity retention ability of aerogel blankets of examples and comparative examples after heat treatment of the aerogel blankets for one hour at 600° C.

The hydrophobicity retention ability upon high-temperature heat treatment of each aerogel blanket produced according to the examples and comparative examples was comparatively analyzed through a furnace test, the result of which is shown in FIGS. 8 to 10.

Specifically, a piece of each aerogel blanket produced according to the examples and comparative examples was heat-treated under conditions of (1) 400° C. for one hour, (2) 500° C. for one hour, or (3) 600° C. for one hour to produce a sample, which was then placed in a water-containing vial, observed for a sign of water absorption, and evaluated for hydrophobicity retention ability.

As shown in FIGS. 8 to 10, in the case of Examples 1 and 2 in which an aerogel powder was used for producing the aerogel precursor, the aerogel blanket exhibits great hydrophobicity retention ability even upon heat treatment at high temperature. In contrast, the aerogel blanket of Comparative Examples 1 and 2 loses hydrophobicity as a result of heat treatment at high temperature. Particularly, the aerogel blanket of Comparative Example 2 in which a hydrophilic powder was used loses hydrophobicity as a result of heat treatment at a relatively low temperature of 400° C. and sinks. Based on this result, it can be expected that when a hydrophilic powder is used, the hydrophobicity will be easily reduced at high temperatures, thus causing the durability at high temperatures to be easily reduced.

Experimental Example 4

NMR-Based Comparative Analysis

NMR analysis was conducted to comparatively analyze the degree of hydrophobization of the surface and inside of each aerogel produced according to Example 2 and Comparative Example 1, the result of which is shown in Table 7 provided below.

In the following Table 7, M stands for a monofunctional group $[Si(OSi)(R_x)_3]$, which was derived from HMDS used for producing an aerogel powder (in this case, $R_x$ is a methyl group). In addition, D stands for a bifunctional group $[Si(OSi)_2(R_y)_2$ and $Si(OSiO)(R_z)_2(OR_w)]$ derived from polydimethylsiloxane (PDMS), which is a surface modifier (in this case, $R_y$, $R_z$, and $R_w$ are each a methyl group), and Q stands for a tetrafunctional group $[(SiO^-)_4]$.

TABLE 7

| peak (intensity) | M | D | Q |
|---|---|---|---|
| Example 2 | 1.0 | 1.1 | 7.8 |
| Comparative Example 1 | — | 1.0 | 3.3 |

As shown in Table 7, in the case of Example 2, a peak, derived from HMDS used for producing the employed hydrophobic aerogel powder, is observed even though NMR analysis was performed on a random portion of the aerogel, which indicates that the employed hydrophobic aerogel powder is homogeneously distributed throughout the aerogel. This is consistent with the expectation that, since the hydrophobic aerogel powder is highly dispersible in an ethanol solution, it will be homogeneously dispersed also in the ethanol-based silica sol of Example 2.

Therefore, it can be seen that the employed hydrophobic aerogel powder is homogeneously distributed in the internal structure as well as in the surface structure of the final aerogel product. Accordingly, it can be confirmed that the aerogel blanket according to the present invention can exhibit high hydrophobicity and excellent hydrophobicity retention ability in a high-temperature application compared to a conventional aerogel blanket.

Experimental Example 5

Comparative Thermogravimetric Analysis

Figure 11:
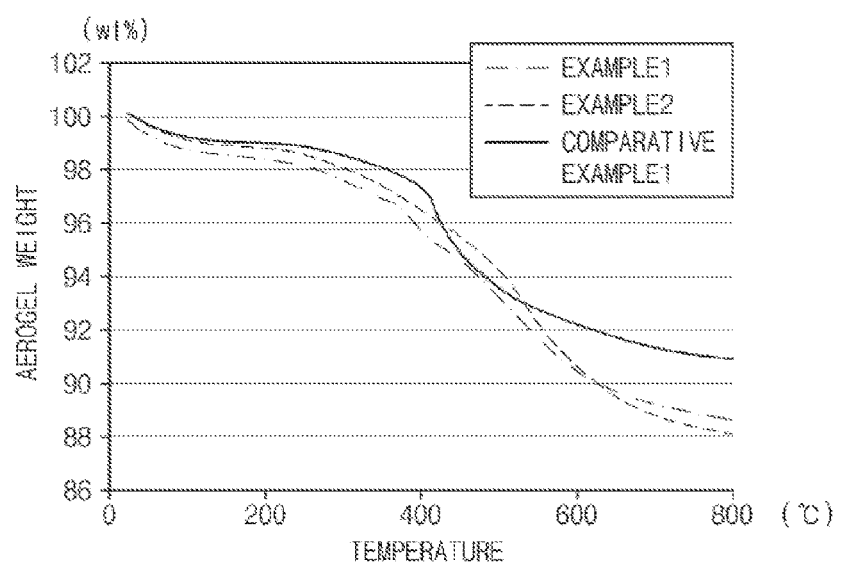
FIG. 11 is a graph for illustrating thermogravimetric analysis (TGA) results for aerogels of examples and comparative examples.

Thermogravimetric analysis (TGA) was performed on each aerogel produced according to Examples 1 and 2 and Comparative Example 1, the result of which is shown in FIG. 11.

Based on the experimental result, it can be confirmed that the aerogels produced according to Examples 1 and 2, in which an aerogel powder was used for producing the aerogel precursor, exhibit excellent hydrophobicity retention ability over a wide temperature range. Unlike the particular case of Comparative Example 1 where most hydrophobic groups are lost at an ultra-high temperature of 500° C. or more, the aerogels of Examples 1 and 2 still retain 6% of hydrophobic groups thereof even at a temperature of 500° C. or more, which confirms excellent stability at high temperatures compared to the case of Comparative Example 1.

Based on the above experimental results, it can be seen that an aerogel blanket produced by employing an aerogel powder for producing an aerogel precursor according to one embodiment of the present invention has excellent hydrophobicity on the surface and inside thereof and thus can stably retain hydrophobicity even in a high-temperature application.

The invention claimed is:

1. A method of producing an aerogel blanket, the method comprising:
   1) mixing a hydrophobic aerogel powder with silica sol to produce an aerogel precursor;
   2) after producing the aerogel precursor, producing a wet gel-substrate composite by: (i) adding a basic catalyst to the aerogel precursor, (ii) depositing a mixture of the basic catalyst and the aerogel precursor onto a blanket substrate, and (iii) gelating the mixture;
   3) after producing the wet gel-substrate composite, producing a hydrophobic wet gel-substrate composite by performing surface modification of the wet gel-substrate composite; and
   4) after producing the hydrophobic wet gel-substrate composite, drying the hydrophobic wet gel-substrate composite.

2. The method of producing an aerogel blanket according to claim 1, wherein the hydrophobic aerogel powder is a silica aerogel powder.

3. The method of producing an aerogel blanket according to claim 1, wherein the hydrophobic aerogel powder is a hydrophobic aerogel powder having a carbon content of 10 to 12 parts by weight with respect to a total weight of the aerogel powder.

4. The method of producing an aerogel blanket according to claim 1, wherein the hydrophobic aerogel powder is used in an amount of 25 parts to 50 parts by weight with respect to 100 parts by weight of silica contained in the silica sol.

5. The method of producing an aerogel blanket according to claim 1, wherein the hydrophobic aerogel powder is an organic functional aerogel powder.

6. The method of producing an aerogel blanket according to claim 5, wherein the organic functional aerogel powder is produced by reacting silica wet gel with an organic compound that is at least bifunctional and then performing drying.

7. The method of producing an aerogel blanket according to claim 5, wherein the organic functional aerogel powder is a surface silylated aerogel powder having characteristics i) or ii) described below:

i) the surface silylated aerogel powder does not contain a Si—OR group (R is an alkyl group having 1 to 18 carbon atoms);
ii) the surface silylated aerogel powder has a degree of coverage, or a degree of cladding, of an internal surface by an organic surface group introduced through surface silylation of 90% or more, wherein the degree of coverage, or the degree of cladding, is calculated according to Equation 1:

Degree of coverage=[C]/[BET]*K; unit: [nm$^{-2}$]  [Equation 1]

where in the above equation, K=6.022*10$^{23}$/100*12*3*10$^{18}$=167.28;
unit: [g$^{-1}$][C]: Carbon content (wt %)
[BET]: BET surface area; unit: [m$^2$/gL.

8. The method of producing an aerogel blanket according to claim 1, wherein the blanket substrate is a reinforcing structure;
wherein the reinforcing structure is a lofty fibrous batting in which fibers are oriented along all three axes;
wherein the lofty fibrous batting is in a sheet form, is compressible to at least 50% of an original thickness thereof and recoverable to at least 70% of the original thickness thereof after five seconds of compression, and has a density of 0.001 g/cm$^3$ to 0.26 g/cm$^3$; and
wherein a cross-sectional area of fibers identifiable from a cross-section of the aerogel blanket finally produced is less than 10% of an entire area of the cross-section of the aerogel blanket.

9. An aerogel blanket comprising an aerogel and a blanket substrate, wherein the aerogel has a carbon content retention ratio calculated according to Equation 2 and satisfies any one of 1) to 5) described below when heat-treated at a temperature equal to or greater than 400° C. and less than 500° C. for one to five hours:

Carbon content retention ratio (%)=(carbon content (wt %) in aerogel after heat treatment)/(initial carbon content in aerogel (wt %)),  [Equation 2]

1) 75% or more upon one-hour heat treatment;
2) 65% or more upon two-hour heattreatment;
3) 60% or more upon three-hour heattreatment;
4) 59% or more upon four-hour heat treatment;
5) 58% or more upon five-hour heat treatment.

10. The aerogel blanket according to claim 9, wherein the carbon content retention ratio satisfies any one of 1) to 5) described below when heat-treated at a temperature equal to or greater than 400° C. and less than 500° C. for one to five hours:
1) 75% to 80% upon one-hour heat treatment;
2) 65% to 75% upon two-hour heattreatment;
3) 60% to 70% upon three-hour heat treatment;
4) 59% to 65% upon four-hour heat treatment;
5) 58% to 64% upon five-hour heat treatment.

11. The aerogel blanket according to claim 9, wherein the aerogel blanket has a thermal conductivity growth rate calculated according to Equation 3 and satisfies any one of 1) to 5) described below when heat-treated at a temperature equal to or greater than 400° C. and less than 500° C. for one to five hours:

Thermal conductivity growth rate (%)=(thermal conductivity (mW/mK) of aerogel blanket at 25° C. after heat treatment)/(initial thermal conductivity (mW/mK) of aerogel blanket at 25° C.),  [Equation 3]

1) 6% or less upon one-hour heat treatment;
2) 10% or less upon two-hour heattreatment;
3) 11% or less upon three-hour heat treatment;
4) 12% or less upon four-hour heat treatment;
5) 13% or less upon five-hour heat treatment.

12. The aerogel blanket according to claim 9, wherein the thermal conductivity growth rate satisfies any one of 1) to 5) described below when heat-treated at a temperature equal to or greater than 400° C. and less than 500° C. for one to five hours:
1) 5% to 6% upon one-hour heat treatment;
2) 7% to 10% upon two-hour heat treatment;
3) 8% to 11% upon three-hour heat treatment;
4) 9% to 12% upon four-hour heattreatment;
5) 10% to 13% upon five-hour heat treatment.

13. An aerogel blanket comprising an aerogel and a blanket substrate, wherein the aerogel has a carbon content retention ratio of 13% or more as calculated according to Equation 2 when heat-treated at a temperature of 500° C. to 600° C. for one to five hours:

Carbon content retention ratio (%)=(carbon content (wt %) in aerogel after heat treatment)/(initial carbon content in aerogel (wt %)).  [Equation 2].

14. The aerogel blanket according to claim 13, wherein the aerogel has a carbon content retention ratio is 15% or more when heat-treated at a temperature of 500° C. to 600° C. for one to five hours.

15. The aerogel blanket according to claim 13, wherein the carbon content retention ratio is 13% to 70% when heat-treated at a temperature of 500° C. to 600° C. for one to five hours.

16. The aerogel blanket according to claim 13, wherein the carbon content retention ratio is 15% to 60% when heat-treated at a temperature of 500° C. to 600° C. for one to five hours.

17. The aerogel blanket according to claim 13, wherein the carbon content retention ratio satisfies any one of 1) to 5) described below when heat-treated at a temperature of 500° C. to 600° C. for one to five hours:
1) 40% or more upon one-hour heat treatment;
2) 24% or more upon two-hour heattreatment;
3) 20% or more upon three-hour heattreatment;
4) 17% or more upon four-hour heat treatment;
5) 15% or more upon five-hour heat treatment.

18. The aerogel blanket according to claim 13, wherein the carbon content retention ratio satisfies any one of 1) to 5) described below when heat-treated at a temperature of 500° C. to 600° C. for one to five hours:
1) 40% to 60% upon one-hour heattreatment;
2) 24% to 50% upon two-hour heattreatment;
3) 20% to 45% upon three-hour heat treatment;
4) 17% to 42% upon four-hour heat treatment;
5) 15% to 40% upon five-hour heat treatment.

19. The aerogel blanket according to claim 13, wherein the aerogel blanket has a thermal conductivity growth rate calculated according to Equation 3 of 17% or less when heat-treated at a temperature of 500° C. to 600° C. for one to five hours:

Thermal conductivity growth rate (%)=(thermal conductivity (mW/mK) of aerogel blanket at 25° C. after heat treatment)/(initial thermal conductivity (mW/mK) of aerogel blanket at 25° C.).  [Equation 3]

* * * * *